United States Patent
Hart et al.

(10) Patent No.: US 7,466,675 B2
(45) Date of Patent: Dec. 16, 2008

(54) METHOD AND APPARATUS FOR SUPPORTING A REDUCED RESOURCE DORMANT STATE FOR PACKET DATA

(75) Inventors: Thomas B. Hart, West Dundee, IL (US); Jay Jayapalan, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 930 days.

(21) Appl. No.: 10/759,654

(22) Filed: Jan. 16, 2004

(65) Prior Publication Data

US 2005/0073969 A1    Apr. 7, 2005

Related U.S. Application Data

(60) Provisional application No. 60/447,656, filed on Feb. 14, 2003.

(51) Int. Cl.
  *H04B 7/216*   (2006.01)
(52) U.S. Cl. .............. 370/329; 370/395.2; 370/431; 370/400
(58) Field of Classification Search .............. None
See application file for complete search history.

(56) References Cited

U.S. PATENT DOCUMENTS

| | | | |
|---|---|---|---|
| 6,654,360 B1 | 11/2003 | Abrol | |
| 6,781,999 B2 | 8/2004 | Eyuboglu et al. | |
| 6,965,588 B2 * | 11/2005 | Schmidt et al. | 370/338 |
| 7,031,291 B2 * | 4/2006 | Chen et al. | 370/342 |
| 7,154,903 B2 * | 12/2006 | Sivalingham | 370/429 |
| 2002/0186696 A1 * | 12/2002 | Lim | 370/395.52 |
| 2003/0128676 A1 * | 7/2003 | Lee | 370/328 |

* cited by examiner

*Primary Examiner*—Wing F Chan
*Assistant Examiner*—Brian Roberts

(57) ABSTRACT

The present embodiments address the need for a reduced resource dormant state for packet data systems (100) that substantially provides the benefits of current dormant mode operation but without the resource maintenance costs. After a period of MS session inactivity, PCF resources, certain PDSN resources, and the PCF-PDSN tunnel are released in order to enter a new reduced resource dormant state. When data arrives for a reduced-resource-dormant MS (101), PDSN-initiated messaging (303) is used to trigger the re-establish PCF resources, a PDSN-PCF tunnel connection (320), and released PDSN resources.

19 Claims, 5 Drawing Sheets

METHOD AND APPARATUS FOR SUPPORTING A REDUCED RESOURCE DORMANT STATE FOR PACKET DATA

REFERENCE(S) TO RELATED APPLICATION(S)

The present application claims priority from provisional application Ser. No. 60/447,656, entitled "METHOD AND APPARATUS FOR SUPPORTING A REDUCED RESOURCE DORMANT STATE FOR PACKET DATA," filed Feb. 14, 2003, which is commonly owned and incorporated herein by reference in its entirety.

FIELD OF THE INVENTION

The present invention relates generally to wireless communication systems and, in particular, to supporting a reduced resource dormant state for packet data.

BACKGROUND OF THE INVENTION

In IS-2000 packet data systems, a mobile station (MS) needs to have a packet data session (as defined by IS-835 P.S0001-0) already established and be in either an active or a dormant state to receive data packets. While radio resources and the selectors may be released in a dormant state, there are still significant static resources maintained in the packet control function (PCF) and the packet data serving node (PDSN) devices. Current standards work in 3GPP2 is defining an "Always-On" feature in which MSs can stay in a dormant state for very long periods of time. As more MSs are deployed with this type of feature and more "push" or "telemetering" type data applications (i.e., applications sending unsolicited data such as stock quotes, sports scores, etc.) are developed, maintaining the static resources, as is done presently, for numerous dormant MSs and for long periods of time is likely to become equipment and cost prohibitive. Therefore, a need exists for an apparatus and method to support a reduced resource dormant state for packet data that substantially provides the benefits of present dormant mode operation without the resource maintenance costs.

DETAILED DESCRIPTION OF EMBODIMENTS

The present embodiments address the need for a reduced resource dormant state for packet data systems that substantially provides the benefits of current dormant mode operation but without the resource maintenance costs. After a period of MS session inactivity, PCF resources, certain PDSN resources, and the PCF-PDSN tunnel are released in order to enter a new reduced resource dormant state. When data arrives for a reduced-resource-dormant MS, PDSN-initiated messaging is used to trigger the re-establish PCF resources, a PDSN-PCF tunnel connection, and released PDSN resources.

Figure 1:
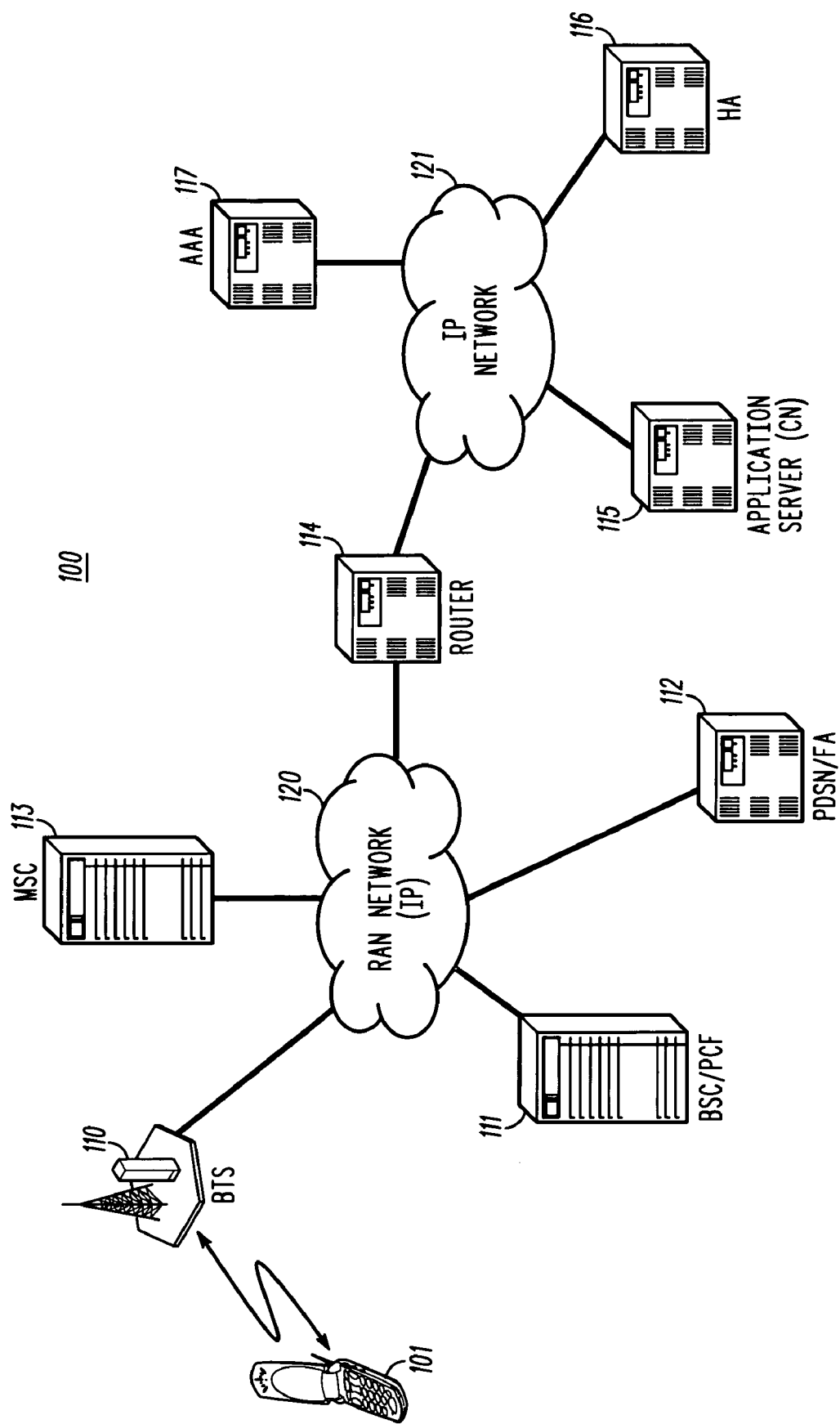
FIG. 1 is a block diagram depiction of a communication system in accordance with an embodiment of the present invention.

The disclosed embodiments can be more fully understood with reference to FIGS. 1-6. FIG. 1 is a block diagram depiction of a communication system 100 in accordance with a first embodiment of the present invention. Communication system 100 is a well-known Code Division Multiple Access (CDMA) system, specifically a cdma2000 system, which is based on the Telecommunications Industry Association/Electronic Industries Association (TIA/EIA) standard IS-2000, suitably modified to implement the present invention. (The TIA/EIA can be contacted at 2001 Pennsylvania Ave. NW, Washington, D.C. 20006). Alternative embodiments of the present invention may be implemented in other wireless technologies that include components equivalent to PCFs and PDSNs.

Figure 2:
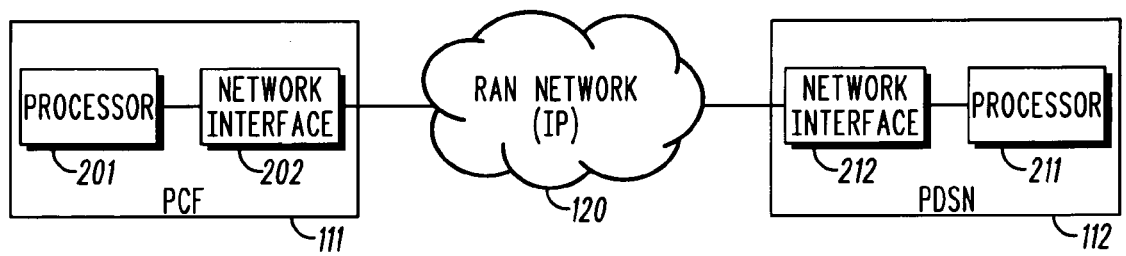
FIG. 2 is a block diagram depiction of the PCF and PDSN of the communication system in accordance with an embodiment of the present invention.

Communication system 100 includes network entities such as radio access network (RAN) IP network 120, base transceiver station (BTS) 110, base station controller/PCF (BSC/PCF) 111, PDSN/foreign agent (PDSN/FA) 112, mobile switching center (MSC) 113, router 114, IP network 121, application server or Correspondent Node (CN) 115, home agent (HA) 116, and Authentication, Authorization and Accounting (AAA) server 117. Communication system 100 also includes remote units such as mobile station (MS) 101. However, the present invention is not limited to MSs that are mobile. For example, an MS may comprise a desktop computer wirelessly connected to the RAN. FIG. 2 is a more detailed depiction of PCF 111 and PDSN 112 of communication system 100 in accordance with a first embodiment of the present invention.

Those skilled in the art will recognize that FIG. 1 and FIG. 2 do not depict all of the network equipment nor remote units necessary for system 100 to operate but only those system blocks and logical entities particularly relevant to the description of embodiments of the present invention. Those skilled in the art are aware of the many ways each of these entities can be implemented and/or purchased from wireless networking companies such as "MOTOROLA."

PCF 111 and PDSN 112 comprise network interfaces 202 and 212 and processors 201 and 211, both respectively. Those skilled in the art are aware of the many ways these entities, both physical and logical, can be either implemented or purchased. Network interfaces, for example, typically comprise components such as communications microprocessors, memory, and/or logic circuitry designed to implement algorithms that have been expressed as computer instructions and/or in circuitry. Likewise, processors typically comprise microprocessors, various memory devices, and/or logic circuitry designed to implement algorithms that have been expressed as computer instructions and/or in circuitry. Given an algorithm or a logic flow, those skilled in the art are aware of the many design and development techniques available to implement communications platforms such as PCFs and PDSNs to perform the given logic.

In a first embodiment of the present invention, a known CDMA2000 PCF and a known CDMA2000 PDSN is adapted using known telecommunications design and development techniques to implement the PCF and PDSN aspects of the present invention. The result is a PCF that performs the method described with respect to FIG. 4 and a PDSN that performs the method described with respect to FIG. 5. Those skilled in the art will recognize that the PCF and PDSN aspects of the present invention may be implemented in and across various physical components, whether co-located or not, of system 100 and are not meant to be limited to PCF and PDSN devices physically.

In general, the present reduced resource dormant state (RRD) provides the capability to deliver data traffic routed by IP address to an idle (as viewed by the infrastructure network) mobile station. This capability is applicable to mobile terminals that utilize Simple IP, Mobile IP, or Proxy Mobile IP. For a mobile that is not actively exchanging data, RRD provides the capability for the data network to release most data resources (R-P tunnel, PPP session, data buffers, etc.) after the session transitions to the RRD state. The session at the mobile can be in an idle or dormant state. The network retains the MIP tunnel and enough context information at the serving system to re-establish the data connection when a new packet of data arrives for the mobile. Once the data connection has been re-established the data packet can be delivered.

Mobiles capable of RRD initiate a data call to establish the PDSN maintained context and then constantly monitor the paging channel to respond to pages for packet data when they are idle or dormant. The PDSN/FA will forward (for Mobile IP) or initiate (for Proxy Mobile IP) a Mobile IP registration to set up HA to PDSN/FA tunnels. As the mobiles move to an area served by a new PDSN, new Mobile IP Registration occurs, which triggers setting up a new HA-to-PDSN/FA tunnel. Mobile IP lifetime renewal also consumes air interface resources. In RRD, this could be avoided by marking the mobile as always on. (Current standards depend on Mobile IP lifetime for always on). In RRD, the network may consider the mobile to be idle when network data resources have been released and only context information is retained, while the mobile may remain in dormant mode to accomplish packet zone triggered data registrations.

Figure 3:
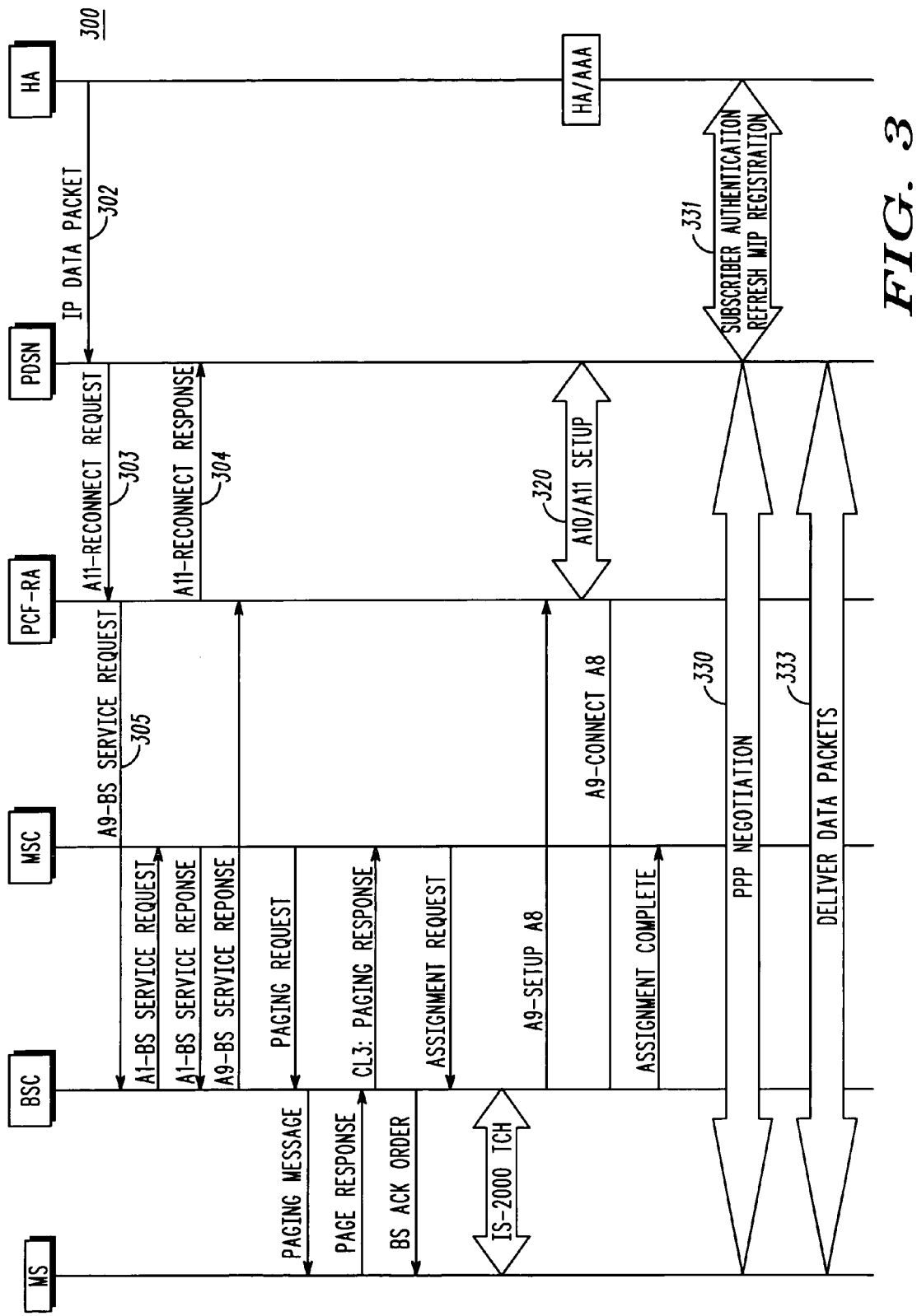
FIG. 3 is a messaging flow diagram of messaging performed in accordance with an embodiment of the present invention.

Operation of a first embodiment occurs substantially as follows with reference to the FIGS. FIG. 3 is a messaging flow diagram of messaging performed in accordance with the first embodiment of the present invention. Through its registration process, MS 101 is assigned a traffic channel and established in an active data session. While this session is active, processor 211 of PDSN 112 maintains session context information for MS 101. In the first embodiment, this session context information comprises session information such as a MIP tunnel binding, a mobile-identifier-to-IP-address mapping (e.g., MIN-to-IP or IMSI-to-IP), a PPP context for MS 101, PCF 111's address, and an A10 tunnel mapping. When PDSN processor 211 receives data for MS 101 via network interface 212, processor 211 forwards the data via network interface 212, a PDSN-PCF A10 tunnel, network 120, and network interface 202 to PCF processor 201. PCF processor 201, which also maintains session resources for MS 101, receives the data and forwards it on to MS 101.

After a period of session inactivity (e.g., a predetermined period of 5 minutes), PCF processor 201 releases the PDSN-PCF tunnel for this session and all the other session resources. Likewise, PDSN processor 211 also releases the PDSN-PCF tunnel for this session and a portion of its session context information. Specifically, PDSN processor 211 releases session context information such as PPP context information maintained for MS 101, PCF 111's address, and the A10 tunnel mapping.

In the first embodiment, unlike PCF 111, PDSN 112 does retain some session context information for MS 101. Retained session information includes the MIP tunnel binding and the mobile-identifier-to-IP-address mapping. In alternative embodiments, however, the PCF address may be retained as well as some of the PPP context information in order to save PPP-renegotiation time. PDSN processor 211 retains the MIP tunnel binding for the duration of the MIP Registration Lifetime or longer for mobiles designated as 'always on' capable. However, to limit the proliferation of old mappings at the PDSN, these mappings may expire based on long duration timers (e.g., MIP Registration Lifetime set to 6-12 hours). Thus, mobiles may be required to periodically initiate a data registration even if not crossing a packet zone. The PDSN could then refresh the MIP tunnel and maintain the mobile-identifier-to-IP-address mapping. To assist in this, RRD mobiles may be paged when their timer is about to expire.

When the session is in the RRD state and PDSN processor 211 receives new data (302) for MS 101 (from CN 115, e.g.), PDSN processor 211 sends (303) a reconnection request for establishment of a new tunnel. This reconnection request sent to PCF 111 is noteworthy because it is initiated by PDSN 112. It is a new message that will be under consideration as a new A11 message (i.e., the A11 Reconnection Request message). The reconnection request will indicate to PCF 111 that the request pertains to MS 101.

In response to receiving the reconnection request, PCF processor 201 requests (305) BSC 111 to initiate the paging of MS 101. This request takes the form of an A9-BS Service Request message in the first embodiment. Also, to indicate that the reconnection request is being serviced, PCF processor 201 sends a reconnection response (304) to PDSN 112. Like the reconnection request, the reconnection response is a new message that will be under consideration as a new A11 message (i.e., the A11 Reconnection Response message). When received by PDSN 112, this response serves as an acknowledgment of the PDSN's reconnection request.

As depicted in messaging flow diagram 300, the A9-BS Service Request message triggers a messaging sequence that re-establishes a traffic channel for MS 101 and a request to PDSN processor 211 from PCF processor 201 to setup a new tunnel for MS 101's session. After PDSN 112 and PCF 111 setup (320) the new tunnel, PDSN processor 211 establishes a new PPP session with MS 101 through PPP renegotiation messaging (330). For mobile IP, MS 101 signals to renew its MIP registration, and PDSN 112 and HA 116 exchange subscriber authentication and MIP refresh messaging (331). Once the PPP session is established PDSN 112 can forward any buffered data (333) to MS 101 via the new tunnel and PCF 111. An active data connection now exists between MS 101 and PDSN/FA 112.

Figure 4:
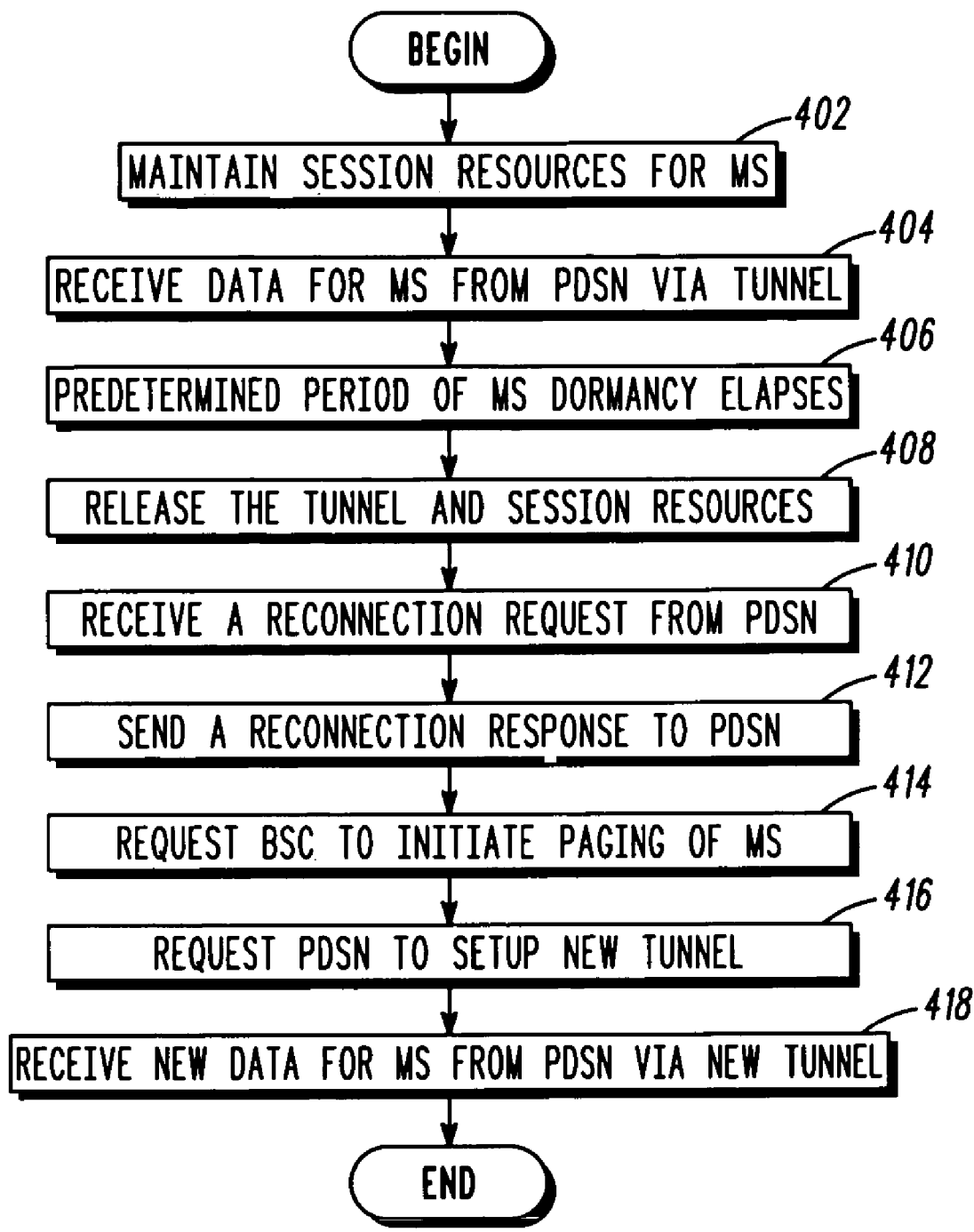
FIG. 4 is a logic flow diagram of functions performed by a PCF in accordance with an embodiment of the present invention.

FIG. 4 is a logic flow diagram of functions performed by a PCF in accordance with the first embodiment of the present invention. Logic flow 400 begins with the PCF supporting an active data session for an MS by maintaining (402) session resources, including a PDSN-PCF tunnel through which data for the MS is received (404). The PCF continues to maintain session resources and receive data for the MS until a predefined period of inactivity (5 minutes, e.g.,) elapses (406). At this point, the PCF releases (408) the PDSN-PCF tunnel and the other resources it has been maintaining for the session.

At some point after releasing the resources, the PCF may receive (410) a reconnection request from the PDSN for the MS. In response to this request but not necessarily in the order depicted in FIG. 4, the PCF sends (412) a reconnection response to the PDSN and requests (414) a BSC to initiate the paging of the MS. After the MS responds and is assigned a traffic channel, the PCF initiates the messaging required to setup a new PDSN-PCF tunnel. In the first embodiment, the PCF sends (416) an A11-Registration Request message to the PDSN to setup the new tunnel. Eventually, the PCF receives (418) data for the MS via the new PDSN-PCF tunnel.

Figure 5:
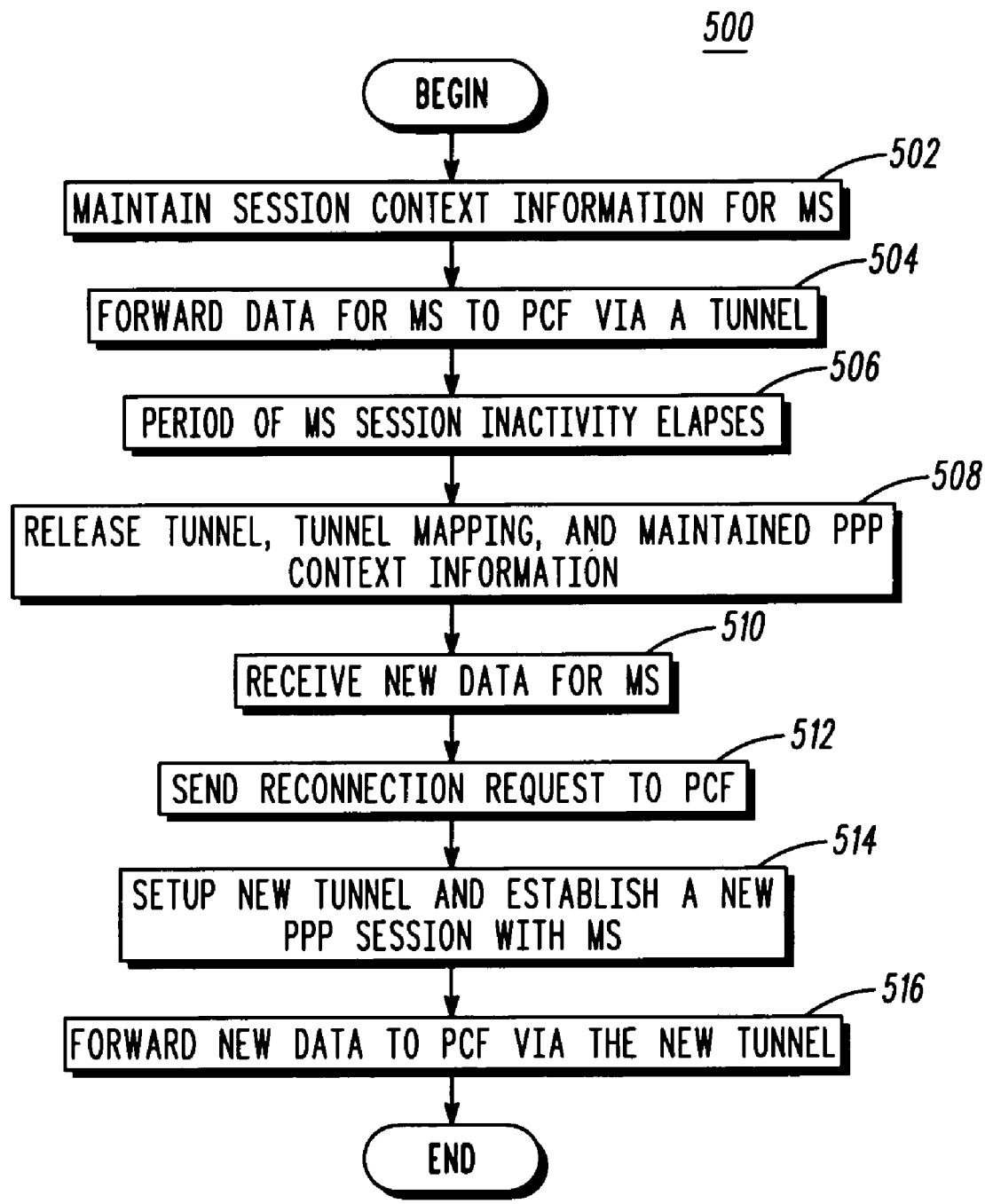
FIG. 5 is a logic flow diagram of functions performed by a PDSN in accordance with an embodiment of the present invention.

FIG. 5 is a logic flow diagram of functions performed by a PDSN in accordance with the first embodiment of the present invention. Logic flow 500 begins with the PDSN supporting an active data session for an MS by maintaining (502) session context information and a PDSN-PCF tunnel through which data for the MS is forwarded (504) to a PCF. The PDSN continues to maintain session context information and forward data for the MS until a predefined period of inactivity (5 minutes, e.g.,) elapses (506). At this point, the PDSN releases (508) the PDSN-PCF tunnel and some of the session context information it has been maintaining, such as the tunnel mapping and PPP context information.

At some point after releasing the PDSN-PCF tunnel, the PDSN may receive (510) new data for the MS. Buffering the data until a connection to the MS can be established, the PDSN sends (512) a reconnection request for the MS to the PCF. In response to this request, the PDSN should receive a reconnection response from the PCF to indicate that the request is being serviced as well as a request to setup a new PDSN-PCF tunnel. The PDSN then performs messaging to setup (514) the new tunnel and to establish a new PPP session with the MS. Once the new PPP session is established, the PDSN can forward (516) any buffered data for the MS to the PCF via the new PDSN-PCF tunnel. Also, since an active data connection now exists between the MS and PDSN, subsequent data for the MS can simply be forwarded via the PDSN-PCF tunnel as described with respect to blocks 502 and 504.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A method for supporting a reduced-resource dormant state for packet data, the method comprising:
    forwarding data for a mobile station (MS) via a tunnel;
    maintaining session context information for the MS;
    releasing the tunnel to support a reduced-resource dormant state;
    releasing a portion of the session context information to support the reduced-resource dormant state,
    receiving new data for the MS after releasing the tunnel;
    in response to receiving new data for the MS, sending a reconnection request for establishment of a new tunnel; and
    forwarding the new data via the new tunnel;
    wherein forwarding data via the tunnel comprises forwarding data to a packet control function (PCF) via the tunnel;
    wherein sending the reconnection request comprises sending the reconnection request to the PCF for establishment of the new tunnel; and
    wherein forwarding the new data comprises forwarding the new data to the PCF via the new tunnel.

2. The method of claim 1, wherein releasing the tunnel and a portion of the session context information comprises releasing the tunnel and a portion of the session context information after a period of MS session inactivity.

3. The method of claim 1, wherein the session context information comprises session information from the group consisting of MIP tunnel binding, mobile-identifier-to-IP-address mapping, PPP context, PCF address, and A10 tunnel mapping.

4. The method of claim 3, wherein the mobile-identifier-to-IP-address mapping comprises at least one of a MIN-to-IP address mapping and an IMSI-to-IP address mapping.

5. The method of claim 1, wherein releasing the tunnel and a portion of the session context information comprises releasing at least a portion of maintained PPP context information.

6. The method of claim 5, wherein releasing the tunnel and a portion of the session context information comprises releasing all maintained PPP context information.

7. The method of claim 1, wherein releasing the tunnel and a portion of the session context information comprises releasing a PCF address.

8. The method of claim 1, wherein releasing the tunnel and a portion of the session context information comprises releasing an A10 tunnel mapping.

9. The method of claim 1, wherein sending the reconnection request comprises sending an A11 Reconnection Request message.

10. The method of claim 1, further comprising receiving a reconnection response from the PCF in response to sending the reconnection request to the PCF.

11. The method of claim 10, wherein receiving the reconnection response comprises receiving an A11 Reconnection Response message.

12. The method of claim 1, further comprising establishing a new PPP session with the MS in response to receiving new data for the MS.

13. A method to support a reduced resource dormant state for packet data, the method comprising:

maintaining session resources for a mobile station (MS);

receiving data for the MS from a packet data serving node (PDSN) via a tunnel;

after a period of MS session inactivity, releasing the tunnel and the session resources;

receiving a reconnection request from the PDSN for establishment of a new tunnel; and receiving new data for the MS from the PDSN via the new tunnel.

14. The method of claim 13, wherein releasing the tunnel and the session resources after a period of MS session inactivity comprises releasing the tunnel and the session resources after a predetermined period of MS dormancy elapses.

15. The method of claim 13, further comprising sending a reconnection response to the PDSN in response to receiving the reconnection request from the PDSN, wherein sending the reconnection response comprises sending at least one of an A11 Reconnection Response message and an indication that the reconnection request is being serviced.

16. The method of claim 13, further comprising requesting a base site controller (BSC) to initiate paging of the MS in response to receiving the reconnection request from the PDSN, wherein requesting the BSC to initiate paging of the MS comprises sending an A9-BS Service Request message to the BSC.

17. The method of claim 13, further comprising requesting the PDSN to setup the new tunnel.

18. A packet control function (PCF) apparatus supporting a reduced resource dormant state for packet data, the PCF comprising:

a network interface; and a processor, communicatively coupled to the network interface, adapted to maintain session resources for a mobile station (MS), adapted to receive data for the MS from a packet data serving node (PDSN) via a tunnel, adapted to release the tunnel and the session resources after a period of MS session inactivity, adapted to receive a reconnection request from the PDSN for establishment of a new tunnel, and adapted to receive new data for the MS from the PDSN via the new tunnel.

19. The PCF apparatus of claim 18, wherein the tunnel comprises an A10 Tunnel and wherein the new tunnel comprises an A10 Tunnel.

* * * * *